(12) United States Patent
Grieb et al.

(10) Patent No.: US 10,025,986 B1
(45) Date of Patent: Jul. 17, 2018

(54) METHOD AND APPARATUS FOR AUTOMATICALLY DETECTING AND REPLAYING NOTABLE MOMENTS OF A PERFORMANCE

(71) Applicant: Agile Sports Technologies, Inc., Lincoln, NE (US)

(72) Inventors: Brian Grieb, Lincoln, NE (US); Andrew Filippini, Lincoln, NE (US); John Hotovy, Omaha, NE (US); Daniel Drews, Omaha, NE (US)

(73) Assignee: Agile Sports Technologies, Inc., Lincoln, NE (US)

( * ) Notice: Subject to any disclaimer, the term of this patent is extended or adjusted under 35 U.S.C. 154(b) by 41 days.

(21) Appl. No.: 15/140,100

(22) Filed: Apr. 27, 2016

Related U.S. Application Data

(60) Provisional application No. 62/153,306, filed on Apr. 27, 2015.

(51) Int. Cl.
*G06K 9/00* (2006.01)
*G06T 7/20* (2017.01)

(52) U.S. Cl.
CPC ..... *G06K 9/00718* (2013.01); *G06K 9/00335* (2013.01); *G06T 7/20* (2013.01)

(58) Field of Classification Search
CPC ........... G06K 9/00711; G06K 9/00718; G06K 9/00724; G06K 9/00744; G06K 9/00751; G06K 9/00335; G06K 2209/00738; G06T 7/20; G06T 2207/30221; G06T 2207/10016; G06F 3/00; G06F 15/173; H04N 7/188; H04N 5/144; H04N 5/145; H04N 21/42204; G11B 27/031; G11B 27/022; G11B 27/036; A63B 24/0062
See application file for complete search history.

(56) References Cited

U.S. PATENT DOCUMENTS

| | | | | |
|---|---|---|---|---|
| 7,167,809 | B2 * | 1/2007 | Li | G06K 9/00711 345/581 |
| 7,739,076 | B1 * | 6/2010 | Vock | A63B 24/0062 702/182 |
| 8,923,607 | B1 * | 12/2014 | Kwatra | G06K 9/00724 382/159 |
| 9,467,723 | B2 * | 10/2016 | Osminer | H04N 21/251 |
| 9,744,421 | B2 * | 8/2017 | Chan | A63B 69/36 |
| 2006/0083305 | A1 * | 4/2006 | Dougherty | H04N 5/145 375/240.12 |

(Continued)

*Primary Examiner* — Jose Couso
(74) *Attorney, Agent, or Firm* — Suiter Swantz pc llo

(57) ABSTRACT

A method and computing device for detecting and outputting notable moments of a performance. The method may be executable by a processor. The method may include receiving, by a processor, an input video stream of a performance. The method may further include determining, by the processor, a notable moment within the input video stream, the notable moment including an amount of motion greater than a threshold value. The method may also include generating, by the processor, a video clip including the determined notable moment, a portion of the input video stream preceding the determined notable moment, and a portion of the input video stream following the determined notable moment. The method may additionally include outputting, by the processor, the video clip.

10 Claims, 18 Drawing Sheets

(56) References Cited

U.S. PATENT DOCUMENTS

| | | | |
|---|---|---|---|
| 2015/0243326 A1* | 8/2015 | Pacurariu | G11B 27/031 386/280 |
| 2015/0262015 A1* | 9/2015 | Oguchi | G06K 9/00624 382/103 |
| 2016/0035392 A1* | 2/2016 | Taylor | G11B 27/34 386/241 |
| 2016/0049173 A1* | 2/2016 | Anderson | G11B 27/10 386/241 |
| 2016/0225410 A1* | 8/2016 | Lee | H04N 21/21805 |
| 2016/0261929 A1* | 9/2016 | Lee | G06K 9/00724 |
| 2016/0292510 A1* | 10/2016 | Han | G06K 9/00724 |
| 2017/0024614 A1* | 1/2017 | Sanil | G06F 17/30781 |
| 2017/0206932 A1* | 7/2017 | Kawaguchi | G11B 27/10 |
| 2017/0300755 A1* | 10/2017 | Bose | G06K 9/00724 |

* cited by examiner

METHOD AND APPARATUS FOR AUTOMATICALLY DETECTING AND REPLAYING NOTABLE MOMENTS OF A PERFORMANCE

CROSS-REFERENCE TO RELATED APPLICATIONS

The present application claims the benefit under 35 U.S.C. § 119(e) of U.S. Provisional Application Ser. No. 62/153,306 filed Apr. 27, 2015. The U.S. Provisional Application Ser. No. 62/153,306 is hereby incorporated by reference in its entirety.

TECHNICAL FIELD

The present disclosure generally relates to the field of video processing of events.

BACKGROUND

In sports such as diving, gymnastics, and track and field, reviewing video of performed skills is a highly valuable mechanism to improve performance. In a typical practice, multiple participants may be practicing performed skills in a rapid manner. Efficiently obtaining and reviewing video after a skill is performed, in practice or competition, may be challenging without personnel dedicated to editing and tagging recorded video to identify segments of the video, to identify the particular individual who is present in the video, and to identify attributes of the skill performed in the video. In competition at the junior level and the high school level, additional personnel needed to acquire and edit the video are typically not available. Consequently, after practice or the competition is over, any video that may have been acquired is usually one large, unedited video which is difficult to use to improve performance.

SUMMARY

Accordingly, the present disclosure is directed to a method and computing device for detecting and outputting notable moments of a performance. The method may be executable by a processor. The method may include receiving, by a processor, an input video stream of a performance. The method may further include determining, by the processor, a notable moment within the input video stream, the notable moment including an amount of motion greater than a threshold value. The method may also include generating, by the processor, a video clip including the determined notable moment, a portion of the input video stream preceding the determined notable moment, and a portion of the input video stream following the determined notable moment. The method may additionally include outputting, by the processor, the video clip.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Embodiments include a method, apparatus, and system for automatically detecting and replaying notable moments of a performance. A computing device may include a camera or be communicatively coupled with a camera configured to capture an input video stream of an event, such as sporting event (e.g., a practice or competition). The computing device, which includes at least one processor, may be configured to automatically or semi-automatically identify the location of a reference object in the input video stream, or the computing device may receive a manual input from a user, where the input identifies the location of the reference object. The computing device is configured to detect notable moments based at least in part on the reference object. A storage device may be configured to store captured notable segments for immediate playback, as well as for further distribution and playback at a later time. The computing device may be configured to tag the notable moments with added metadata for each stored notable moment. The computing device may include a display or be communicatively coupled with a display, and the computing device may be configured to output video to such display so as to present the notable moments to a user for immediate review, such as during the sporting event.

In some embodiments, a computing device for automatically detecting and replaying notable moments of a performance may be implemented in or as a single computing device, such as a smart phone or tablet computing device including a camera; however, other embodiments may be implemented as or include any combination of any suitable devices, such as laptop computers, cameras, displays, and servers. For example, edited video may be viewed on an external display which is communicatively coupled to the computing device via a wired or wireless connection.

Figure 1:
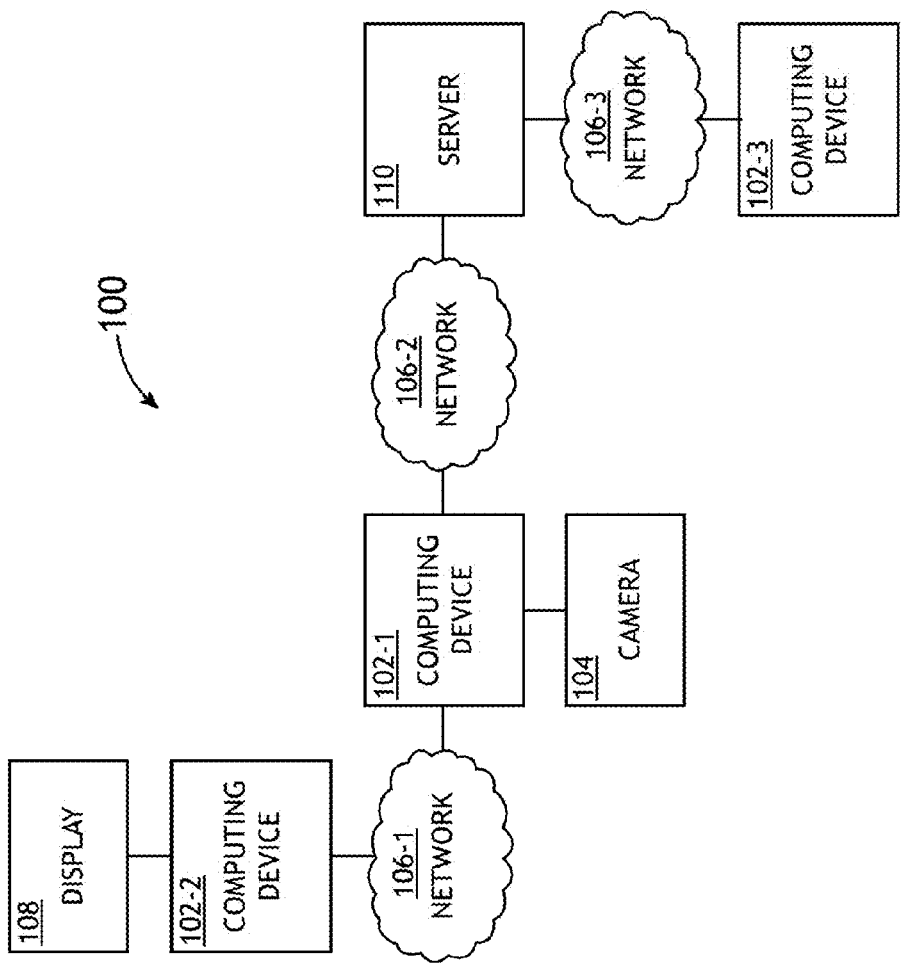
FIG. 1 shows an exemplary embodiment of a system according to the inventive concepts disclosed herein.

Referring now to FIG. 1, an exemplary embodiment of a system 100 according to the inventive concepts disclosed herein includes computing devices 102-1, 102-2, 102-3, a camera 104, networks 106-1, 106-2, 106-3, a display 108, and a server 110. Some or all of the computing devices 102-1, 102-2, 102-3, the camera 104, the networks 106-1, 106-2, 106-3, the display 108, and the server 110 may be communicatively coupled at any given time.

In exemplary embodiments, the computing device 102-1 is implemented as a mobile computing device, such as a smart phone or a tablet computing device (e.g., an iPad); however, the computing device 102-1 may be implemented as any suitable computing device (e.g., a laptop computer) in other embodiments. The computing device 102-1 may be configured to perform any of the operations disclosed throughout. For example, the computing device 102-1 may be configured to detect and replay notable moments of a performance, to automatically or semi-automatically identify a location of a reference object in an input video stream, and to receive a manual input from a user which identifies the location of the reference object. The computing device 102-1 may be configured to detect notable moments based at least in part on the reference object. The computing device 102-1 may include or be coupled to a storage device (e.g., 110) configured to store captured notable segments for immediate playback, as well as for further distribution and playback at a later time. The computing device 102-1 may be configured to tag the notable moments with added metadata. The computing device 102-1 may include a display (e.g., 318) or be communicatively coupled with the display 108, and the computing device may be configured to output video to such display (e.g., 108 or 318) so as to present the notable moments to a user for immediate review, such as in real-time during the sporting event.

The computing device 102-1 may include a camera (e.g., 302), and the computing device 102-1 may be configured to record video, detect notable moments, generate a graphical user interface to allow user to interact with the video. The computing device 102-1 may also be configured to output data (e.g., a video stream) to other devices, such as the computing devices 102-2 and 102-3, the server 110, and the display 108. The computing device 102-1 may also be configured to receive data (e.g., a video stream) from other devices, such as the computing devices 102-2 and 102-3, the server 110, and the display 108.

In an exemplary embodiment, the computing device 102-1 may be communicatively coupled to the camera 104, which is configured to capture images and video of an event, such as sporting event. The camera 104 is configured to output images and/or a video stream to the computing device 102-1. While FIG. 1 exemplarily depicts the computing device 102-1 and the camera 104 as separate devices, in some embodiments, a camera (e.g., 302) may be integrated as part of the computing device 102-1.

The computing device 102-1 may be communicatively coupled to any number of suitable networks (e.g., 106-1, 106-2, and 106-3).

For example, the computing device 102-1 may be connected to the computing device 102-2 via the network 106-1. For example, the network 102-1 may be a local area network (LAN) or a wireless area network (WAN). For example, the computing device 102-1 may be configured to transmit video clips of notable moments to the computing device 102-2 via the network 106-1. The computing device 102-2 may be implemented as any suitable computing device. For example, the computing device 102-2 may be implemented as a router or media server (e.g., AppleTV or Roku) configured to output the video clips to the display 108 for presentation to a user. The display 108 (e.g., an external display) may receive the output for presentation to a user. The display 108 may be located in a location desirable for playback and review of the video clips created of the notable moments. For example, the display 108 may be communicatively coupled to the computing device 102-1 via any suitable connection, such as a wireless router connection, a wireless peer to peer connection (e.g., through an AppleTV), or a wired connection, such as a high-definition multimedia (HDMI) cable.

Additionally, for example, the computing device 102-1 may be connected to the server 110 via the network 106-2, and the server 110 may be connected to the computing device 102-3 via the network 106-3. For example, the networks 102-2 and 102-3 may be the internet.

Additionally, computing device 102-1 may be controlled via a wireless remote or controlled remotely by another computing device communicating over a network (e.g., 106-1, 106-2, 106-3). Remotely controlling the computing device 102-1 may allow a user to manipulate video, select a clip to be displayed, and manipulate recording during practice or competition without having to interact directly with the computing device 102-1 and/or external display 108. For example, a coach could pause, rewind, and slow down playback of the last dive that just happened by interacting with a remote or remotely coupled device. Additionally, a coach could select a clip to compare with the last dive that just happened using a remote control or remotely coupled device to browse previous clips and choose a desired clip. The remote control or remotely coupled device may be implemented as any suitable computing device (e.g., similar to computing devices 102-1, 102-2, and 102-3), such as a handheld computing device (e.g., a smart phone) or wearable device (e.g., a smart watch, smart glasses, or headset).

In some embodiments, the system 100 may include any suitable number of computing devices.

Figure 2:
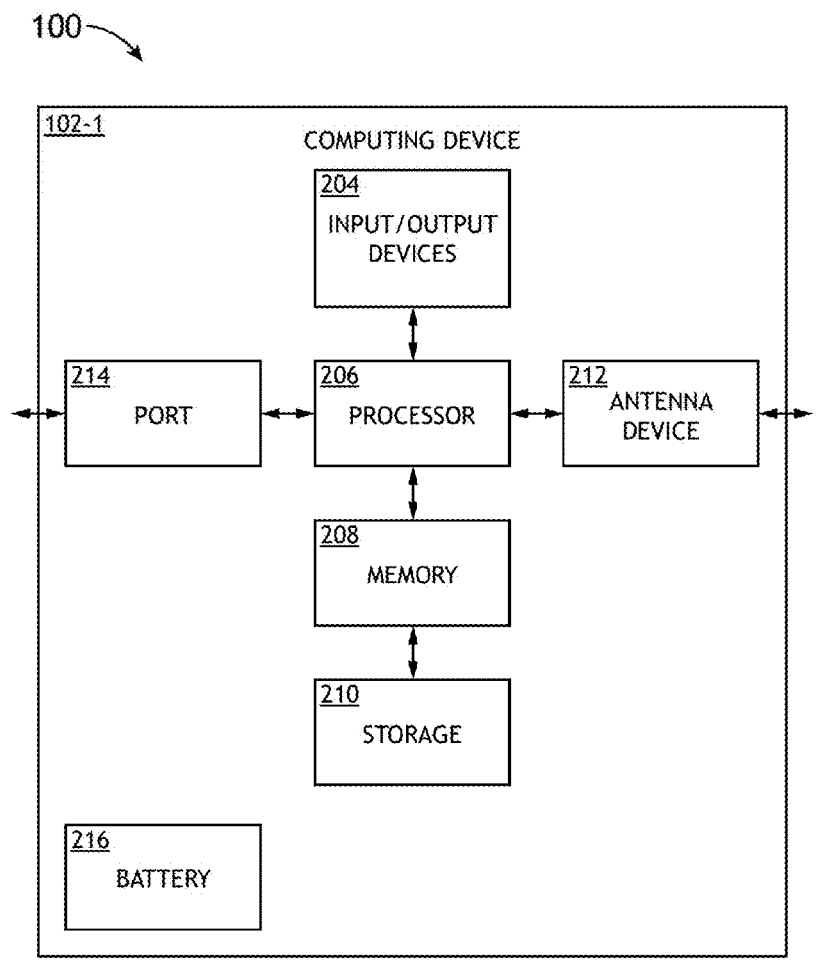
FIG. 2 shows one of the computing devices of FIG. 1 of an exemplary embodiment according to the inventive concepts disclosed herein.

Referring now to FIG. 2, the computing device 102-1 of FIG. 1 of an exemplary embodiment may include one or more input/output devices 204, at least one processor 206, at least one memory 208, storage 210 (e.g., a hard disk drive or solid state drive), at least one antenna device 212, at least one port 214 (e.g., at least one Ethernet port, at least one universal serial bus (USB) port, at least one Thunderbolt port, or a combination thereof), and a power source (e.g., battery 216), as well as other components, equipment, and/or devices commonly included in a computing device, all of which may be communicatively coupled to one another.

The processor 206 may be configured to run various software applications (e.g., operating systems, programs, and/or "apps") or computer code stored in a non-transitory computer-readable medium (e.g., memory 208 or storage 210) and configured to execute various instructions or operations. The processor 208 may be configured to perform any of the operations disclosed throughout or cause performance of any of the operations disclosed throughout. In some embodiments, the processor 206 may be programmed as a special purpose processor or implemented as part of a special purpose computer programmed to execute specific operations, such as disclosed throughout.

The computing device 102-1 may communicate with other devices and over networks (e.g., 106-1, 106-2, and/or 106-3) by sending and receiving signals through the at least one port 214 and/or via the at least one antenna device 212.

The one or more input/output devices 204 may allow a user to interface with the computing device 102-1.

Figure 3:
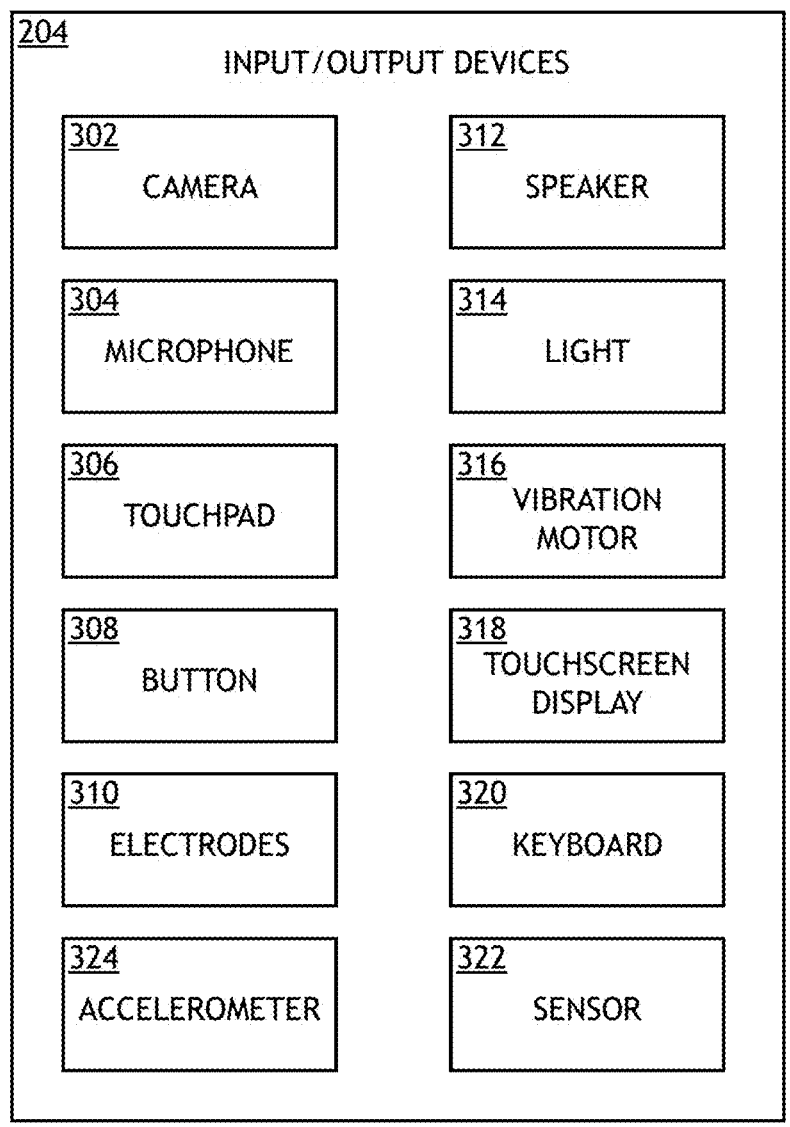
FIG. 3 shows input/output devices of FIG. 2 of an exemplary embodiment according to the inventive concepts disclosed herein.

Referring now to FIG. 3, the one or more input/output devices 204 of FIG. 2 of an exemplary embodiment may include any suitable input/output devices. For example, the one or more input output/devices 204 may include some or all of the following: at least one camera 302, at least one microphone 304, at least one touchpad 306, at least one button 308, one or more electrodes 310, at least one speaker 312, at least one light 314 (e.g., a light emitting diode (LED)), at least one vibration motor 316, at least one display (e.g., at least one touchscreen display 318), at least one keyboard 320, at least one sensor 322, and/or at least one accelerometer 324. Each of the one or more input/output devices 204 may be communicatively coupled with the processor 206. While FIG. 3 exemplarily depicts the one or more input output/devices 204 as being included within the computing device 102-1, in some embodiments, at least one of the one or more input output/devices 204 may be implemented in or as a peripheral input/output device communicatively coupled with the computing device 102-1.

The computing devices 102-2 and 102-3 may be implemented and function similarly to the computing device 102-1 of FIGS. 1-3 except that the computing devices 102-2 and/or 102-3 may further include additional components and/or omit some components depicted with respect to the computing device 102-1. Additionally, for example, the computing devices 102-2 and/or 102-3 may be configured (e.g., programmed) to perform similar as well as different operations as compared to the computing device 102-1.

Additionally, for example, the server 110 may be implemented and function similarly to the computing device 102-1 of FIGS. 1-3 except that the server 110 may further include additional components and/or omit some components depicted with respect to the computing device 102-1. Additionally, for example, the server 110 may be configured (e.g., programmed) to perform similar as well as different operations as compared to the computing device 102-1.

Figure 4:
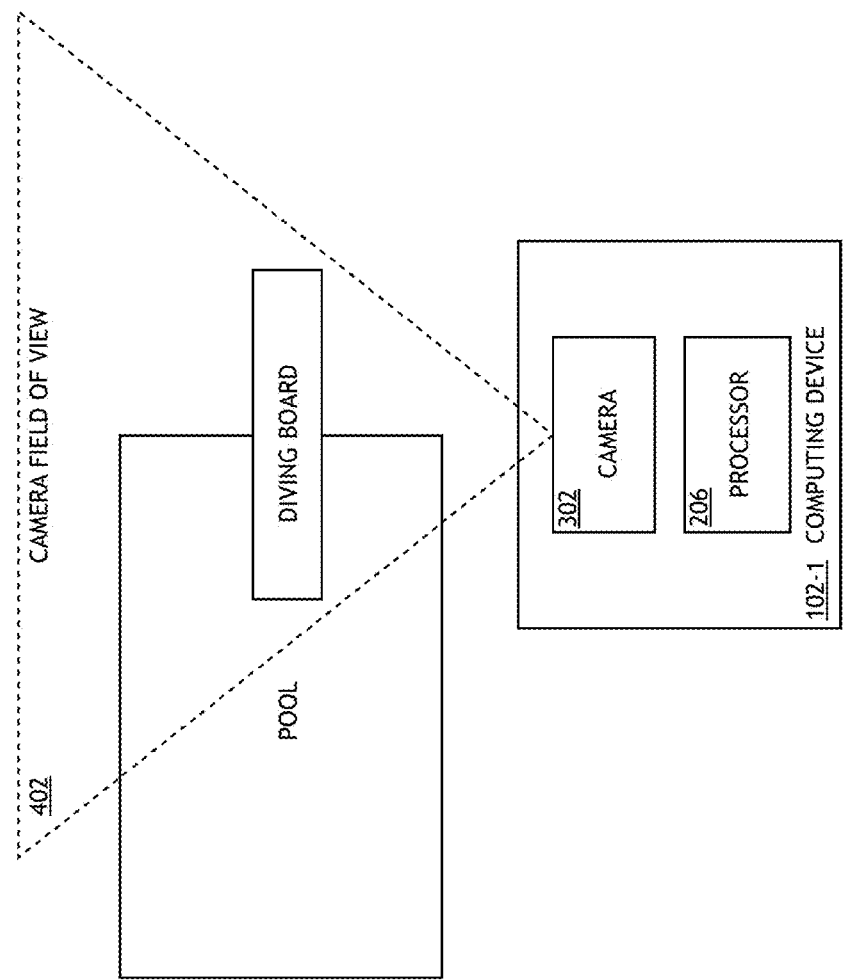
FIG. 4 shows the computing device of FIGS. 1-3 configured to capture video of a sporting event of an exemplary embodiment according to the inventive concepts disclosed herein.

Referring now to FIG. 4, the computing device 102-1 of FIGS. 1-3 configured to capture video of a sporting event (e.g., a diving event) as a video input stream, record the video input stream, process the video input stream, and output a processed video input stream according to an exemplary embodiment is depicted. For example, the camera 302 of the computing device 102-1 may be positioned and configured to capture video of a diving event. The camera 302 may be positioned and/or zoomed such that the camera field of view 402 captures a desired portion of the event, such as the diving board and the pool. In some embodiments, the computing device 102-1 may be mounted on a stationary tripod such that the camera field of view 402 captures a desired portion of the event. While FIG. 4 depicts the camera 302 of the computing device 102-1 as capturing video of the event, in other embodiments any suitable camera, such as the camera 104 of FIG. 1, may capture video of the event and output a video stream to the computing device 102-1. While the computing device 102-1 is exemplarily depicted with respect to a diving event, in other embodiments, the computing device 102-1 may capture video of any desired event.

In some embodiments, the computing device 102-1 is configured to receive an input video stream from the camera 302 in substantially real time as an event is happening. In some embodiments, the computing device 102-1 is configured to receive or access (e.g., load or read) a video stream or other previously captured and/or processed video stored (e.g., as a file) in a non-transitory computer readable medium (e.g., the memory 208 and/or the storage 210). The computing device 102-1 is configured to process the input video stream. For example, the computing device 102-1 is configured to detect notable moments of the input video stream.

The processor 206 of the computing device 102-1 may be configured to detect notable moments in the input video stream based at least on detected reference objects. In an exemplary embodiment, the camera 302 recording video may be stationary (e.g. the computing device 102-1 may be mounted on a tripod). The processor 206 of the computing device 102-1 may also be configured to receive and utilize environmental data, such as data associated with information of a location, event (e.g., a sport), and/or skill, to generate clips (e.g., notable moment clips) that may assist a user (e.g., an instructor or coach). The processor 206 of the computing device 102-1 may utilize such environmental data to identify and capture notable moments with respect to specific surroundings and associated with specific types of sport skills that may be performed.

The processor 206 of the computing device 102-1 may be configured to determine (e.g., locate and/or identify) one or more reference objects. In some embodiments, the processor 206 of the computing device 102-1 is configured to automatically or semi-automatically determine a location of a reference object. In other embodiments, the processor 206 of the computing device 102-1 is configured to determine a location of a reference object based on at least on a user input (e.g., a user selection, a user's performance of a touch gesture on the touchscreen display 318, a voice command, and/or a combination thereof) and/or event data (e.g., predetermined event diving event data that includes predetermined information and/or instructions for the processor 206 to locate a diving board in the input video stream). For example, the processor 206 of the computing device 102-1 may determine the diving board in FIG. 4 to be a reference object, the processor 206 may output a request for a user to confirm that the diving board is the desired reference object, and the processor 206 may receive a user input confirming that the diving board is the desired reference object. Additionally, in some embodiments, the reference object may be manually set.

In some embodiments, the processor 206 of the computing device 102-1 may be configured to determine the location of a reference object at least by applying an object detection method within the camera field of view 402 to make a prediction of the reference object's location, as described in more detail below. If, for example, the reference object is not identified successfully, the processor 206 may prompt a user to input information about the reference object or to make a selection. In some embodiments, the processor 206 may store such user input and/or selections to adjust and improve the processor 206's reference object detection operations in the future.

In an exemplary embodiment, the processor 206 of the computing device 102-1 may perform one or more of the following operations to determine a reference object: perform color filtering on a video frame using a standard hue, saturation, and value (HSV) range for the reference object; erode and dilate the video frame to remove noise in the color filtering process; locate contours within the eroded and dilated frame; and select a particular contour that most closely meets predetermined criteria. For example, the criteria may include one or more of the following: height (e.g., a height between a specified maximum and minimum height), width (e.g., a width between a specified maximum and minimum width), shape (e.g., rectangular, parallelpiped, round, or spherical), area (an area between a specified maximum and minimum area), and/or a largest or smallest contour (e.g., measured by either arc length or area).

In some embodiments, the processor 206 may be configured to determine and to recognize one or more participant reference objects within the input video stream. For example, a participant (e.g., a diver, a gymnast, or a track and field participant) may include (e.g., wear or be marked with) or be implemented as a participant reference objects. The participant reference objects may be visible to the camera 302 or the camera 104, but not necessarily visible or conspicuous to humans. For example, in some embodiments, participant reference objects may be implemented as visible to humans, but not necessarily as conspicuously indicating that the participant reference objects are being used by the computing device 102-1 as participant reference objects. Additionally, in some embodiments, participant reference objects may be implemented as invisible to humans, such as by reflecting or emitting electromagnetic wavelength(s) outside of the visible spectrum, such as infrared light or ultraviolet light. For example, at least one of the cameras 104 or 302 may be implemented as an infrared camera configured to detect and image infrared light emanating from a diver, and the processor 206 may recognize the diver to be the participant reference object based at least on processing infrared imagery. Exemplary participant reference objects may be implemented as or include one or more of the following: a participant, himself or herself, (e.g., a diver or gymnast); at least one body part (e.g., a head, a hand, a foot, a torso, a leg, or an arm); a helmet; clothing (e.g., cap (e.g., a swim cap or baseball cap), a shoe, a glove, a sock, a swimsuit, a uniform (e.g., a gymnastic uniform, a team's swimsuit, a jersey, uniform pants), a shirt, shorts, and/or pants); sport equipment (e.g., a racquet, a club, a ball, and/or a helmet); at least one sticker, patch, ink, or tape affixed to the participant or a participant's article (e.g., helmet, clothing, sport equipment, and/or a combination thereof); and/or a combination thereof. For example, a participant reference object may be implemented as a water resistant sticker or bandage affixed to a diver's camera-side shoulder.

The processor 206 of the computing device 102-1 may be configured to determine (e.g., locate and/or identify) and recognize one or more participant reference objects. In some embodiments, the processor 206 of the computing device 102-1 is configured to automatically or semi-automatically determine a location of a participant reference object. In other embodiments, the processor 206 of the computing device 102-1 is configured to determine a location of a participant reference object based at least on a user input (e.g., a user selection, a user's performance of a touch gesture on the touchscreen display 318, a voice command, and/or a combination thereof) and/or event data (e.g., predetermined event diving event data that includes predetermined information and/or instructions for the processor 206 to locate a predetermined participant reference object (e.g., a swimsuit or a sticker worn on a diver's shoulder) in the input video stream). For example, the processor 206 of the computing device 102-1 may determine a diver's swimsuit (e.g., in FIG. 14) to be a participant reference object, the processor 206 may output a request for a user to confirm that the swimsuit is the desired participant reference object, and the processor 206 may receive a user input confirming that the swimsuit is the desired participant reference object. Additionally, in some embodiments, the participant reference object may be manually set.

For example, the processor 206 may recognize a diver's swimsuit to be a participant reference object, and the processor 206 may perform various video processing operations in response to recognizing the swimsuit to be a participant reference object. Additionally, for example, once the processor 206 determines the occurrence of a notable moment and generates a noticeable moment clip, the processor 206 may be configured to recognize a diver's swimsuit as a participant reference object and calculate analytical metrics (e.g., height (e.g., jump height), distance (e.g., jump distance), time (e.g., hang time, run time), speed (e.g., jump speed, swing speed, run speed), rotational velocity (e.g., of a diver or gymnast), or a combination thereof). Additionally, in some embodiments, the processor may utilize a recognized participant reference object to identify a participant; for example, participant reference objects may include unique or semi-unique (e.g., unique to a particular team) camera-visible markers, which the processor 206 may recognize as belonging to a specific participant or specific group (e.g., a team) of participants. For example, camera-visible markers may include alphanumeric character(s) (e.g., a number), a color, and/or a shape.

Figure 5:
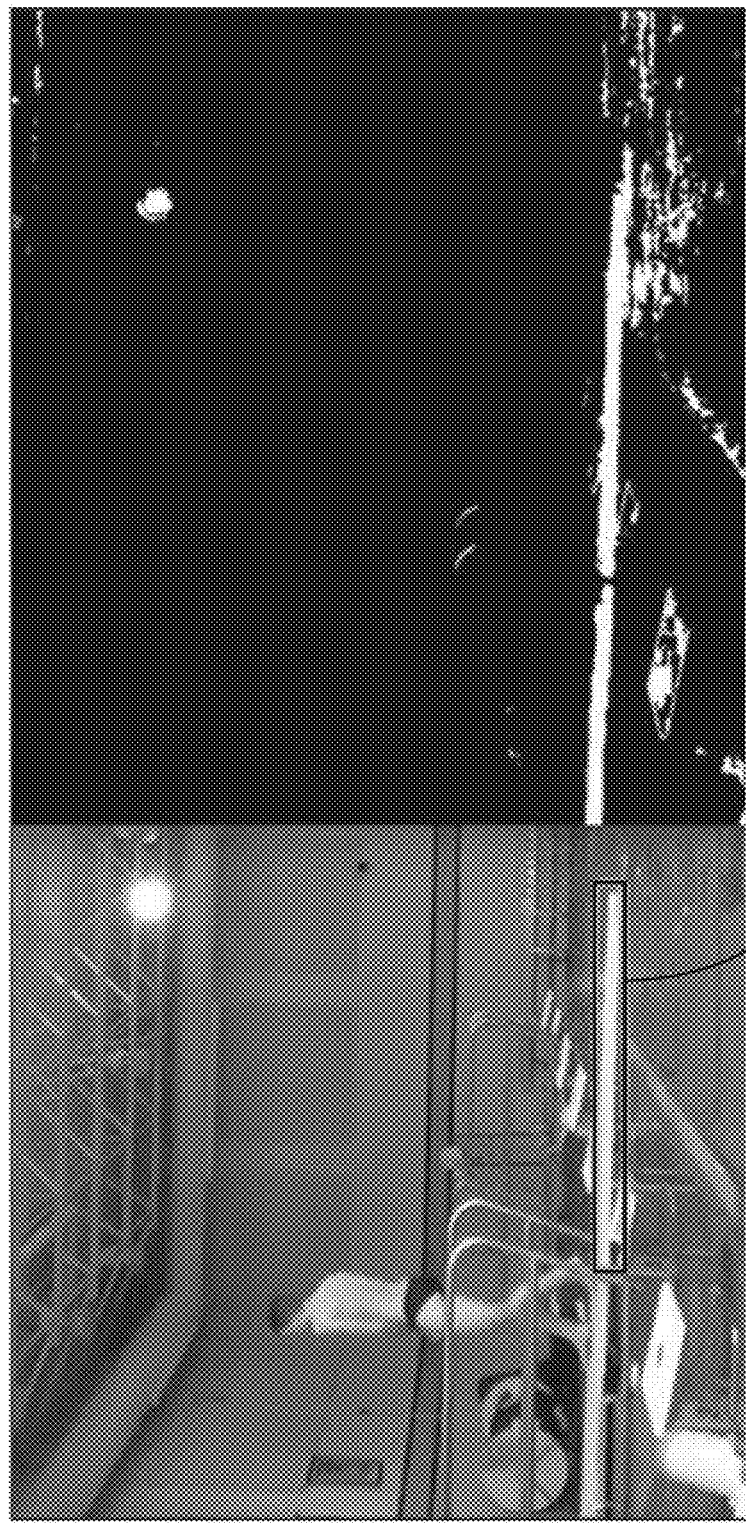
FIG. 5A shows a partially processed video frame with the diving board highlighted of an exemplary embodiment.
FIG. 5B shows a partially processed video frame associated with the video frame depicted in FIG. 5A, after performing reference object detection steps.

Referring now to FIG. 5A, a partially processed video frame of an exemplary embodiment is shown. The processor 206 may be configured to indicate (e.g., highlight on a displayed video frame) the diving board as a predicted reference object 501 to the user. The processor 206 may output the location for the predicted reference object 501 as an overlay on the video. In some embodiments, the processor 206 may calculate a confidence value for the predicted reference object 501 correctly being the desired reference object, and if the confidence value is below a threshold confidence value, the processor 206 may prompt the user to verify the accuracy (e.g., correctness) of the predicted reference object 501 as being the desired reference object.

Referring now to FIG. 5B, the processor 206 may be configured to process a video frame to output a processed video frame as depicted in FIG. 5B of on exemplary embodiment. The processed video frame of FIG. 5B may be a video frame resulting from the processor 206 performing steps of performing color filtering, eroding and dilating the video frame to remove noise in the color filtering process, and locating contours within the eroded and dilated frame, and selecting a particular contour, as described above and in more detail below.

Figure 6:
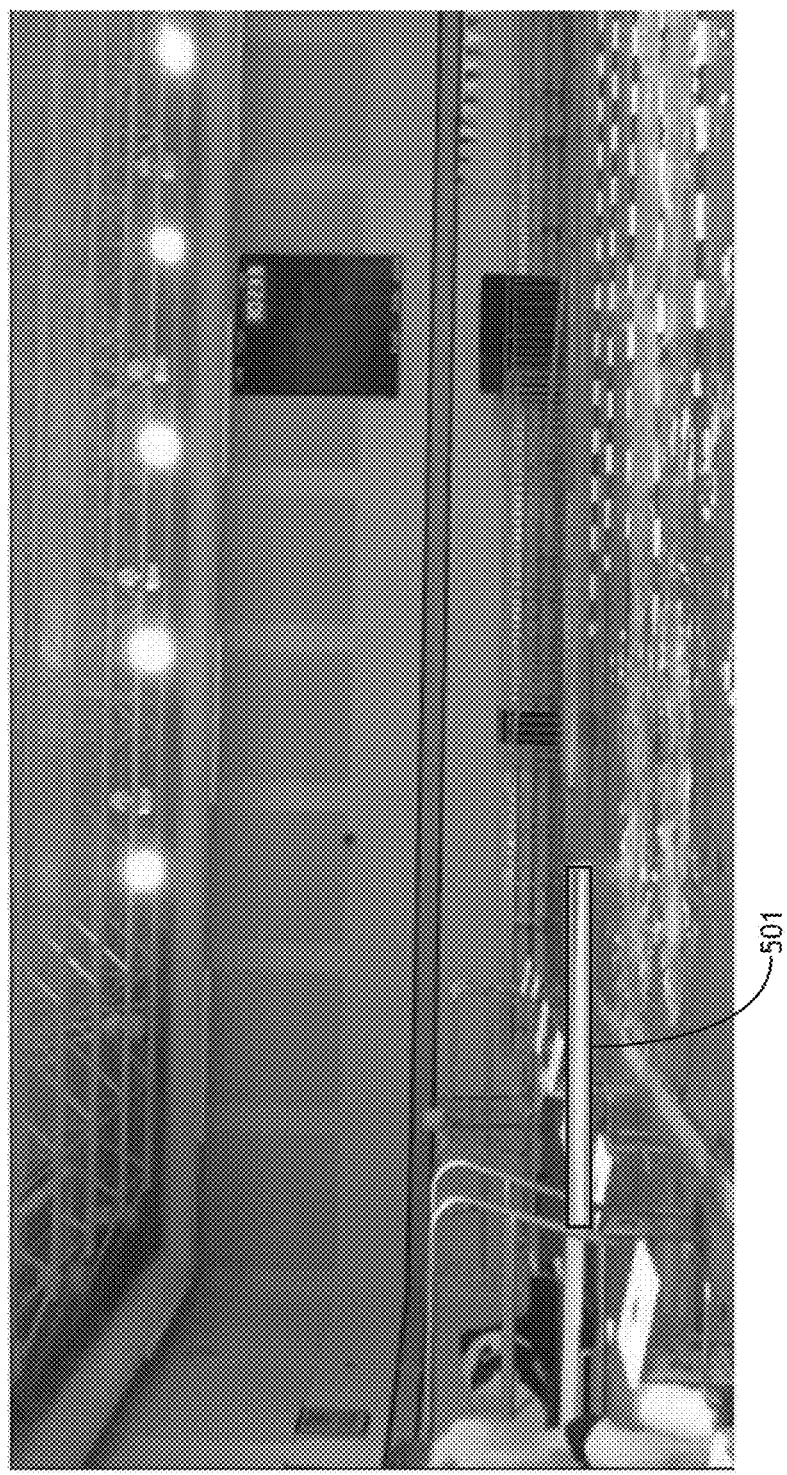
FIG. 6 is a screenshot of an exemplary embodiment of a processed video frame displayed by the touchscreen display of the computing device of FIGS. 1-4, where the processed video frame includes an indication, shown as highlighting, that the diving board is the predicted reference object.

Referring now to FIG. 6, a screenshot of a processed video frame displayed by the touchscreen display 318 includes an indication (e.g., shown as highlighting) that the diving board is the predicted reference object 501. The processor 206 may prompt the user to confirm the accuracy of the predicted reference object 501. If the predicted reference object 501 is indicated as incorrect by the user, the processor 206 may prompt the user to input (e.g., such as by performing a touch gesture on the touchscreen display 318 or by performing a voice command detected by the microphone 304) a location of the desired reference object by using at least one of the input/output devices 204 to indicate a location of the reference object.

Referring now to FIGS. 7-11, a series of screenshots is depicted corresponding to the processor 206 prompting a user to complete an initial setup process for a situation where the processor 206 of the computing device 102-1 does not fully, automatically detect the location of the reference object.

Figure 7:
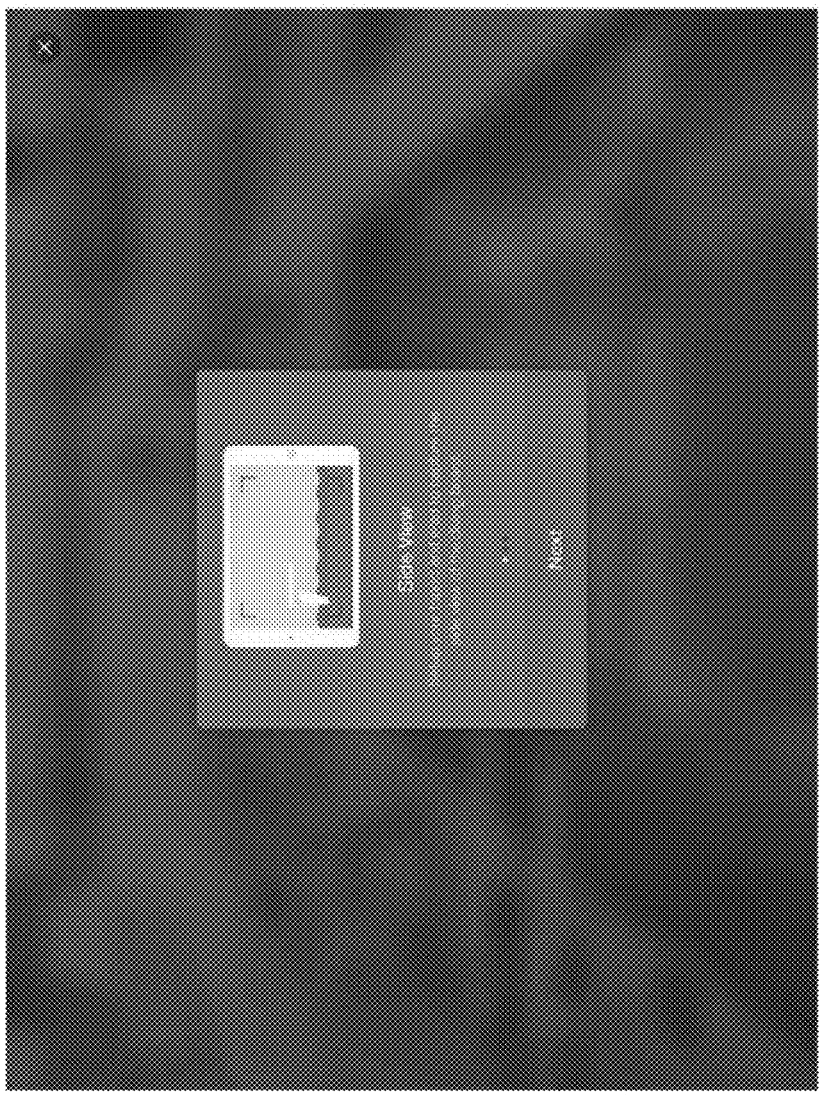
FIG. 7 is a screenshot of an exemplary embodiment displayed by the touchscreen display of the computing device of FIGS. 1-4 presenting an instruction to the user of how to orient the camera with respect to the reference object.

Referring now to FIG. 7, a screenshot displayed by the touchscreen display 318 presents an instruction to the user of how to orient the camera 302 with respect to the reference object (e.g., which is the diving board) to effectively capture diving video.

Figure 8:
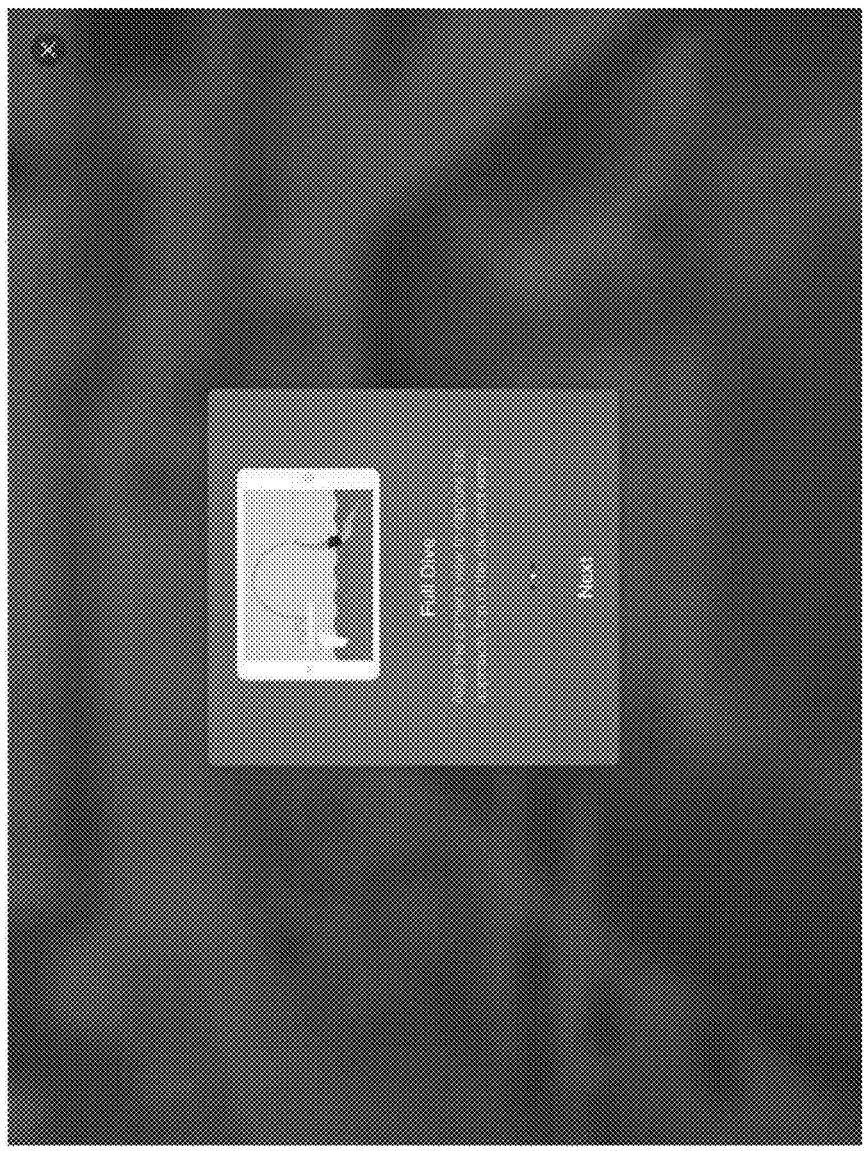
FIG. 8 is a screenshot of an exemplary embodiment displayed by the touchscreen display of the computing device of FIGS. 1-4 presenting an additional instruction to the user of how to setup and align the camera to capture a diver's approach, full dive, and entry.

Referring now to FIG. 8, a screenshot displayed by the touchscreen display 318 presents an additional instruction to the user of how to setup and align the camera 302 to capture a diver's approach, full dive, and entry.

Figure 9:
FIG. 9 is a screenshot of an exemplary embodiment displayed by the touchscreen display of the computing device of FIGS. 1-4 presenting an instructional screen that assists the user in aligning the camera correctly and prompts the user to confirm when the camera is accurately aligned to capture the full scene.

Referring now to FIG. 9, a screenshot displayed by the touchscreen display 318 presents an instructional screen that assists the user in aligning the camera 302 correctly and prompts the user to confirm when the camera 302 is accurately aligned to capture the full scene.

Figure 10:
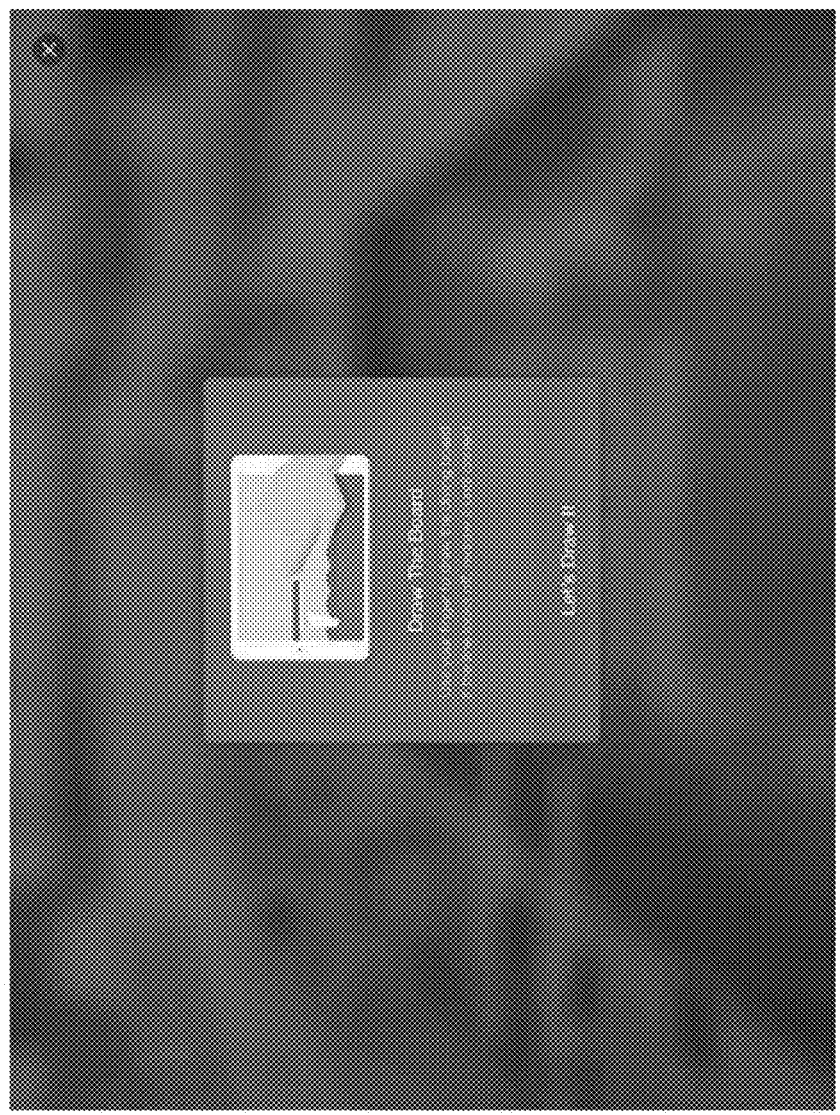
FIG. 10 is a screenshot of an exemplary embodiment displayed by the touchscreen display of an exemplary embodiment presenting an instructional screen providing instructions of how the user may perform a touch gesture on the touchscreen display of the computing device of FIGS. 1-4.

Referring now to FIG. 10, a screenshot displayed by the touchscreen display 318 of an exemplary embodiment presents an instructional screen providing instructions of how the user may perform a touch gesture (e.g., by drawing a line corresponding to a location of the reference object as the diving board) on the touchscreen display 318. The touchscreen display 318 may detect the touch gesture and output touch data to the processor 206. The processor 206 is configured to receive the touch data and determine a location of a reference object within the video frame based on the received touch data. As such, the processor 206 of the computing device 102-1 is configured to determine the location of the diving board as the reference object.

Figure 11:
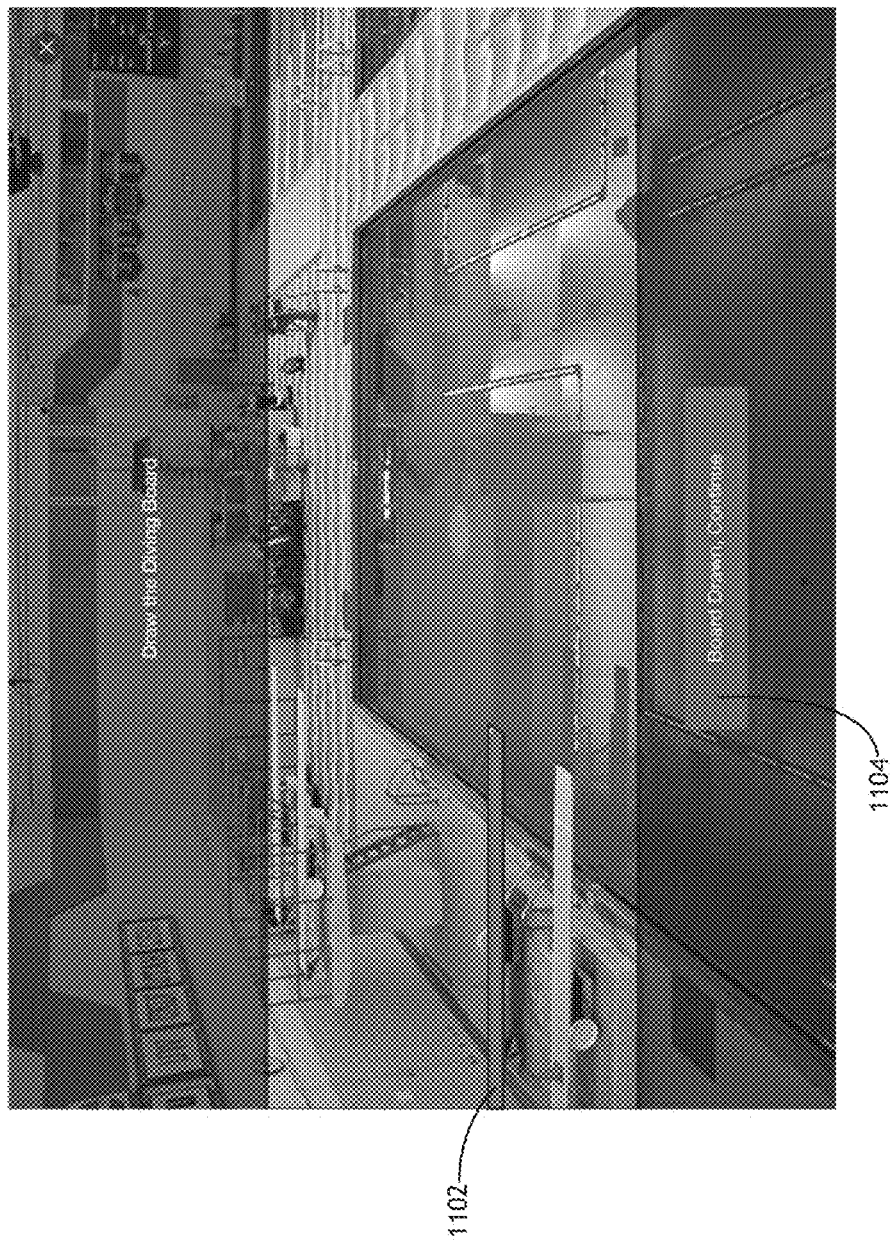
FIG. 11 is a screenshot displayed by the touchscreen display of the computing device of FIGS. 1-4 of an exemplary embodiment.

Referring now to FIG. 11, a screenshot displayed by the touchscreen display 318 of an exemplary embodiment is depicted. The processor 206 prompts the user to input (e.g., by performing a touch gesture, such as by drawing a line or a perimeter) a location of the diving board as the reference object and to tap the "Board Drawn, Continue" button 1104 when finished. In some embodiments, as the user draws on the touchscreen display 318, a colored overlay 1102 may show the line that the user has drawn on the reference object. Additionally, for example, the user may redraw the line to correct mistakes by simply touching and dragging the user's finger on the screen at a new location.

In some embodiments, upon a user manually identifying the location of the reference object, the processor 206 may measure average H, S, and V values of pixels that are marked as being the reference object. The processor 206 may store the H, S, and V values for future use so that such values may be used when performing color filtering (as described above) to increase a likelihood that the processor 206 can automatically recognize the reference object during a next session.

In some embodiments, once a location of the reference object is determined, the location of the reference object does not need to be updated unless the location of the camera 302 changes. The location of the reference object may be stored by the processor, and the information may be used with for the performance of other operations by the processor 206 or other computing devices (e.g., the computing devices 102-2 and/or 102-3 and the server 110).

In some embodiments, the at least one accelerometer 324, analysis (e.g., by the processor 206) of video captured by the camera 302, and/or other sensors 322, may be used to detect if the camera 302 has moved. For example, the processor 206 may determine that the computing device has been bumped based on receiving data from the at least one accelerometer 324 indicating that the computing device has moved. If the processor 206 determines that the camera 302 has moved (e.g., based on data received from one or more of the following: the at least one accelerometer 324, the camera 302, and the other sensors 322), the processor 206 may trigger a process of relocating the reference object, such as by repeating steps described above.

Figure 12:
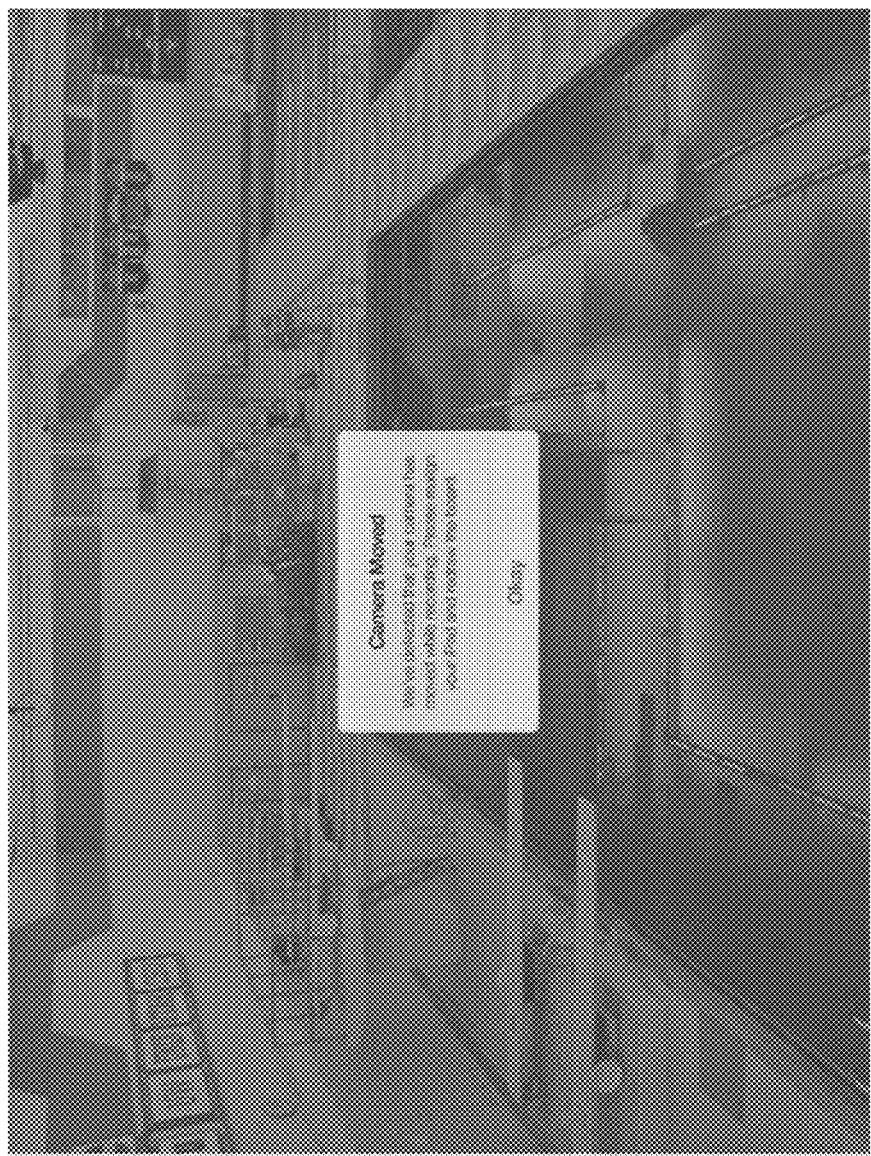
FIG. 12 is a screenshot displayed by the touchscreen display of the computing device of FIGS. 1-4 of an exemplary embodiment.

Referring now to FIG. 12, a screenshot displayed by the touchscreen display 318 of an exemplary embodiment is depicted. The processor 206 may output a warning message that may be presented to the user indicating that the camera 302 has moved and may prompt the user to identify a new location of the reference object in order to re-orient the camera 302.

While exemplary methods of identifying and/or determining a location of reference object have been described and illustrated, some embodiments may include additional or different approaches for determining a reference object. For example, determining (e.g., by the processor 206) the location of a reference object may include one or more of the following operations: matching (e.g., by the processor 206 or another computing device) by known histogram of oriented gradients, matching by known histogram of HSV or red-green-blue (RGB) values, matching by known template matching, matching by utilizing the Viola-Jones algorithm, matching by utilizing feature recognition such as by utilizing Speeded Up Robust Features (SURF) and maximally stable extremal regions (MSER), and/or matching by use of a convolutional neural network.

In some embodiments, the operations performed to detect and locate a reference object may vary based at least on one or more of event type (e.g., may vary from sport to sport), the nature of the reference object, the computing device's 102-1 and/or camera's 302 performance capabilities, and/or environmental conditions (e.g., lighting and/or position of the camera). In exemplary embodiments, reference objects may include: for diving, a diving board; for baseball or softball, home plate, a base, a batter's box, and/or a pitching mound; a long jump pit; for pole vault, a pole vault cross bar and/or standards, and/or a vault; for gymnastics, bar(s) or a beam(s); and for golf, a golf tee or golf mat. Further, in some embodiments, any suitable stationary object (e.g., a coat rack or a cone) may be placed in or near an area of a performance to be used as a reference object, such as for a dance performance.

Additionally, in some embodiments, the processor 206 may add (e.g., graphically overlay) an additional marker or a set of markers to the reference object that may be presented to the user in a processed video stream. For example, added markers to the reference object may assist an instructor, coach, and/or user, as well as the processor 206, in determining characteristics of a performance, such as height, distance, and/or speed. The processor 206 may utilize the marker or set of markers to perform measurements, for example, by calculating a number of pixels between markers and calculating a distance based on distance per pixel value. The processor 206 may utilize the measurements to provide objective feedback to the user, for example, by providing height of a jump, width of a jump, and splash height. Further, for example, a marker such as colored tape may be physically added to a side of a diving board at predetermined (e.g., one foot or any suitable distance) increments. Additionally, for example, a bright colored stick may include dark colored markers at predetermined (e.g., one foot or any suitable distance) increments and placed next to the takeoff point for a long jump.

In some embodiments, upon identifying the reference object, the processor 206 may analyze the video for notable moments. The processor 206 may analyze one or more (e.g., each, some, or all) frames of video and determine when a notable moment has occurred by performing various operations.

When the processor 206 detects a notable moment, the processor 206 may generate a clip of the video stream that includes video of the notable moment, and the processor 206 may store the clip for future playback or analysis. Generating (e.g., by the processor 206) the clip may include adding extra video (e.g., pre-pending or post-pending video) before and/or after the notable moment in the clip that such that the clip includes video of a participant's actions leading up to the notable moment and/or following completion of the notable moment. For example, if the processor 206 determines that a notable moment spans a diver's jump to entry into pool, the processor 206 may generate a clip that includes the notable moment as well as the diver's approach and the splash after the dive. Similarly, for example, a clip may include a long jumper's approach and landing after a jump. For example, a notable moment for an exemplary dive may be six seconds, and a corresponding notable moment clip may be eight seconds long with six seconds of notable moment video, one second of pre-notable moment video, and one second of post-notable moment video.

In some embodiments, the processor 206 is configured to detect a notable moment. For example, the processor 206 may be configured to perform motion detection operations on the video stream. Performing motion detection operations may include analyzing a set of points positioned in the video frames against a motion threshold and calculating a motion flow.

In some embodiments, the computing device 102-1 may output frames of a video stream to an image classifier processor or a neural processor network to detect notable moments. For example, an image classifier processor may be implemented as a support vector machine, and a neural processor network may be implemented as a convolutional neural network.

Figure 13:
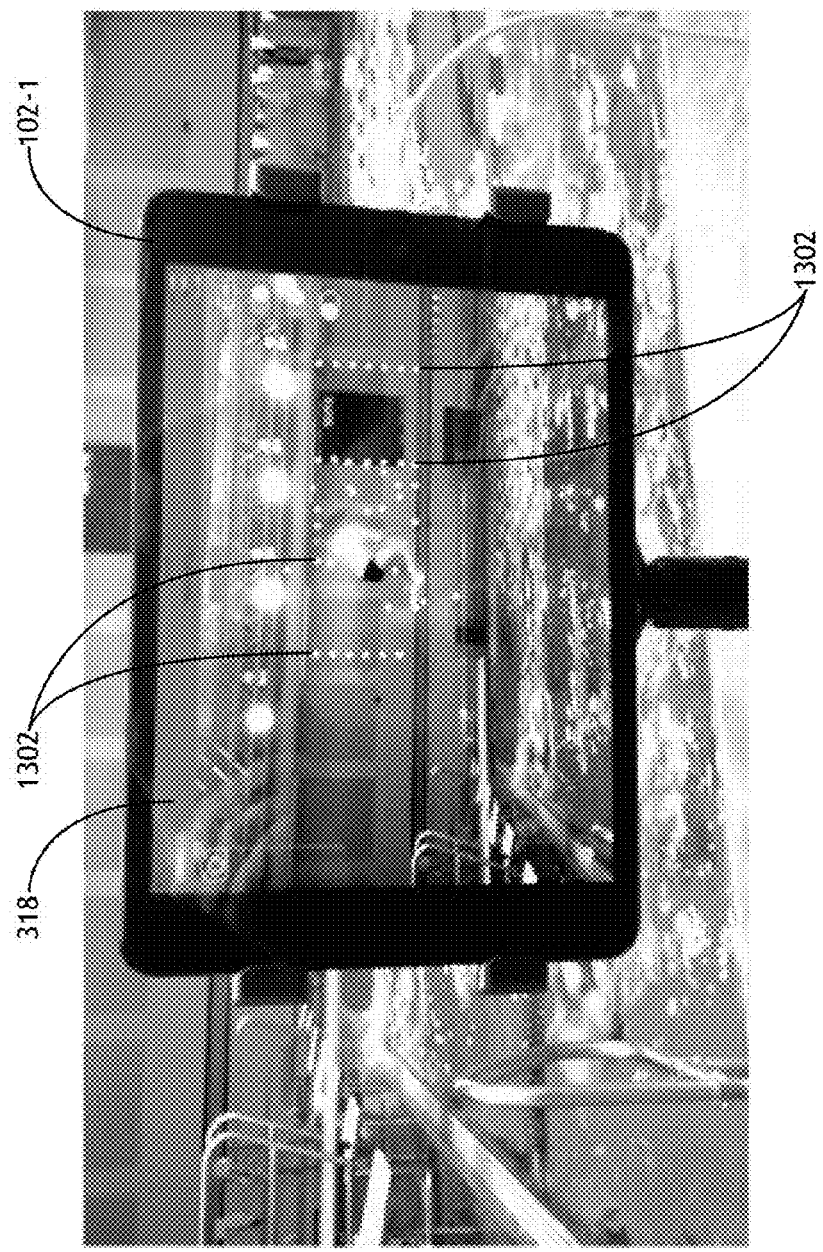
FIG. 13 is a view of the computing device of FIGS. 1-4 displaying a video frame that includes motion detection graphical indicators of an exemplary embodiment.
Figure 14:
FIG. 14 is a view of the computing device of FIGS. 1-4 displaying an additional video frame that includes the motion detection graphical indicators of FIG. 13 of an exemplary embodiment.

Referring now to FIGS. 13-14, a view of a computing device 102-1 displaying a video frame that includes motion detection graphical indicators (e.g., motion detection points (e.g., dots; each motion detection point corresponding to a single pixel or a cluster of pixels) 1302) of an exemplary embodiment is shown. As shown in FIGS. 13-14, the processor 206 is configured to graphically overlay the motion detection points 1302 on video frames; however, in other embodiments, the processor 206 only utilizes the motion detection points 1302 for performing operations (e.g., calculations) by the processor 206, and the processor does not graphically output video with visibly overlaid motion detection points 1302; similarly, in some embodiments, the motion detection points 1302 may be toggled to be visible or invisible to a user. For example, the motion detection points 1302 may be displayed as colored (e.g., yellow) dots on the touchscreen display 318. The processor 206 may be configured to detect the motion of a diver passing through a region (e.g., a rectangular region) where the motion detection points 1302 have been overlaid on video frames. For example, the processor 206 may place the motion detection points 1302 just off the end of the diving board (which has been identified as the reference object). The processor 206 may be configured to determine whether a notable moment has occurred by analyzing motion detected at the motion detection points 1302. For example, the motion of a diver moving through the region where the motion detection points 1302 have been placed may trigger the processor 206 to calculate a flow of motion. While the motion detection points 1302 have exemplarily been described as points, in some embodiments, each motion detection point 1302 may be implemented as corresponding to a single pixel or cluster of pixels of video frames.

For example, the processor 206 may calculate a motion flow and determine whether a notable moment has occurred based at least in part on whether the calculated motion flow exceeds a predetermined threshold. In some embodiments, the predetermined threshold may correspond to an amount (e.g., a fractional amount or whole amount) of motion flow calculated with respect to a previous known event (e.g. a previous dive). The processor 206 may be configured to calculate a motion flow by analyzing video frames and the motion detection points 1302 against previous frames. Additionally, the processor 206 may be configured to perform an optical flow operation(s) on the motion detection points 1302 to track the motion detection points 1302 from frame to frame.

The processor 206 may be configured to perform optical flow operations on the frames at the motion detection points 1302 to calculate where the motion detection points 1302 have moved to in the current frame as compared to the previous frame. For example, the processor 206 may be configured to sum a total magnitude of change between the motion detection points 1302 of the current frame and the motion detection points 1302 of a preceding frame. The processor 206 may be configured to compare the calculated total magnitude against a threshold value to determine if motion has been detected. For example, the threshold value may be adjusted based at least on a type of performance being monitored and a desired sensitivity.

In some embodiments, the processor 206 may utilize multiple motion detection points 1302 to determine the occurrence of a notable moment. In some embodiments, detection of motion at some of the motion detection points 1302 may result in the processor 206 determining that a notable moment has occurred, while detection of different amounts of motion or detection of motion at other motion detection points 1302 may result in the processor 206 determining that a notable moment has not occurred. For example, the processor 206 is configured for determining that a notable moment has occurred or that a false positive event has occurred. For example, when the processor 206 determines that a false positive event has occurred, the processor 206 has determined that motion at one or more of the motion detection points 1302 has occurred but that an aggregate magnitude of the motion did not exceed a threshold value for indicating the occurrence of a notable moment. On the other hand, for example, when the processor 206 determines that a notable moment has occurred, the processor 206 may detect motion at one or more of the motion detection points 1302 and determines that an aggregate magnitude of the motion does exceed a predetermined threshold value for indicating the occurrence of a notable moment.

In some embodiments, the processor 206 may improve or optimize the location of the motion detection points 1302 in the video based on a location and/or shape of the reference object (e.g., previously determined by the processor 206). For example, for a diving video, the motion detection points 1302 are positioned off the end of the diving board (which is the reference object) such that the processor 206 can detect a diver passing through that region when performing a dive. By positioning the motion detection points 1302 relative to the reference object, the processor 206 improves functioning of the processor 206, itself, and improves accuracy and efficiency of motion detection by focusing the processor's computational motion detection operations at points particularly relevant to where an event is occurring (e.g., near and between the diving board and the pool's surface) and ignoring motion that may occur in portions of the video frame which are not relevant to the particular event. By focusing on only relevant portions (e.g. at the motion detection points 1302) of the video frame, the processor 206 may be configured to operate efficiently and accurately to detect motion indicative of a notable moment while operating in real-time as the video is captured. Additionally, the processor 206 may be configured to identify notable moments as they occur and output video clips including the notable moments to the display 302 (or another display, such as the display 108) for immediate review as they are detected during practice.

Additionally, for example, for a high bar in gymnastics, the motion detection points may be positioned in a region surrounding the high bar because motion in that region is where the gymnast will be executing skills on that high bar. When motion is no longer detected in that region for a predetermined duration of time, the processor 206 may determine that the gymnast has dismounted from the high bar. Further, for example, for a long jump or triple jump pit, some of the motion detection points 1302 may be positioned directly above the pit to detect a jumper passing through the motion detection points and landing in the sand.

In some embodiments, the processor 206 is configured to instantly determine a false positive motion event or determine a false positive motion event over some duration of time. For example, the processor 206 may determine the occurrence of an instant false positive motion event if the processor 206 detects motion in each frame and if motion is detected (in an area not expected to be part of the event area); if the processor 206 determines the occurrence of an instant false positive motion event, the processor 206 will determine that a notable moment has not been detected. For example, the processor 206 may determine the occurrence of an durational (or timer) false positive motion event if the processor 206 detects motion in one area in each frame and if motion is not detected in another area before or within an expected period (e.g., a predetermined expected period) of time; for example, if the processor 206 detects motion in a first area without detecting expected motion in a second area for a predetermined amount of time, the processor 206 may determine that a notable moment has not occurred. Additionally, for example, a person walking in front of the camera 302 may trigger the processor 206 to determine the occurrence of a false positive motion event.

In some embodiments, the processor 206 may calculate a single motion flow for all of the motion detection points 1302, combined; however, in other embodiments, the processor 206 may calculate separate motion flows for one or more of the motion detection points 1302, individually. In some embodiments, the processor 206 may be configured to determine specific points or all of the motion detection points 1302 to be used for calculating a motion flow, and whenever the processor 206 detects motion in a new frame, the processor 206 may calculate the optical flow magnitude for each of the specific points or all of the motion detection points 1302. The processor 206 may be configured to calculate the flow magnitude for each of the motion detection points 1302 as a single set of optical flow operations and can greatly increase performance of the processor 206, itself. The processor 206 may be configured to calculate the optical flow magnitude for each of the specific points or all of the motion detection points 1302 while, from frame to frame, keeping track of points associated with each motion detection point 1302 and correctly associating corresponding calculations with each motion detection point 1302.

The processor 206 may be further configured to detect and determine the occurrence of changes in light from frame to frame. For example, the processor 206 may determine if the environment's light level is stable enough for a notable moment to be captured and/or detected by the computing device 102-1. For example, the processor 206 may track light changes by first trimming each frame to a small amount of pixels at the top of the frame. Each trimmed frame may have the same width as the original frame but have a fraction (e.g., $\frac{1}{12}^{th}$, or any suitable fraction) of the height. The processor 206 may calculate an average intensity of each trimmed frame. The processor 206 may compare the average intensity of the previous trimmed frame to the average intensity of the current trimmed frame. If there is a difference in the average pixel intensity greater than a predetermined threshold value (e.g., 3.5, or any other suitable value), then the processor 206 may determine that a notable moment has not occurred, but rather that the motion detection was likely caused by lighting changes and not athlete motion.

In some embodiments, after the processor 206 generates video clips including the notable moments, the processor 206 may be configured to analyze each clip and tag each clip with metadata based on calculated metrics of each clip, such as a metric suggesting the identity(ies) of the participant(s) in each clip. For example, the metric may include a distance measurement, and the processor 206 may be configured to calculate a distance measurement that is 1) relative to a reference object's location and 2) dependent on a unique or semi-unique physical feature of the participant (e.g., the participant's height).

For example, the processor 206 may analyze each frame of a video clip (or a video stream) in sequence and determine whether the particular frame is a relevant frame. In some embodiments, the processor 206 is configured to calculate a metric on some or all of the relevant frames, and an average calculated metric may be tagged to the clip.

For example, relevant frames that may be used for identifying a participant are frames in which the metric calculation would be expected to output a result which accurately identifies the participant in the event. For example, if the metric is the participant's height, then a relevant frame is any frame in which the participant is standing upright.

In some embodiments, the processor 206 may be configured to determine relevant frames by performing one or more of the following steps: 1) determining a relevant location based on a reference object's position, where a relevant location is a position (e.g., point or region) in which motion would likely be occurring in relevant frames, such as for example, if the metric is a diver's height, then the start of a diving board would be a relevant location because participants are likely to be standing upright at that location; 2) adding a particular motion detection point 1302 at or in the relevant location; and 3) if motion is detected in the frame at the particular motion detection point 1302, the frame is relevant.

In some embodiments, the processor 206 may be configured to calculate metrics by performing one or more of the following steps: 1) applying a background subtraction filter to a frame to generate a binary or bitonal image with white pixels indicating only moving objects, such as the participant; 2) applying erosion and dilation filters to the binary or bitonal image to eliminate noise; 3) applying a contour detection algorithm to the resulting image and storing the contours in an array in a computer readable medium (e.g., memory 208 or storage 210); 4) calculating an arc length of each contour and removing all but a pre-determined number of the longest (or most relevant) contours; 5) selecting a single point of interest from the resulting set of contours, where the single point of interest may be selected based on a point being a leftmost, rightmost, highest, or lowest point along all contours depending on the metric or, in some embodiments, any suitable method may be performed to select the single point of interest; and 6) outputting a distance measured between the selected point of interest and a location on a reference object.

In some embodiments, the processor 206 may be configured to analyze each clip, such as by utilizing computer vision techniques, to determine objective attributes of the skill being performed. For example, the processor 206 may be configured to determine one or more of the following: a maximum height of a participant during performance of a skill; a rotational velocity of the participant; an amplitude of moment of the reference object; an amplitude of moment of other surrounding objects (e.g. amount of splash during a dive); a hang time of the participant (e.g. amount of time a long jumper or diver is in the air); and a speed of the participant.

In some embodiments, the computing device 102-1 may include the display 302 for immediate review of notable moments during a practice or competition. The display 302 may be an integrated component of the computing device 102-1; in some embodiments, the computing device 102-1 is communicatively coupled (e.g., by a high-definition multimedia (HDMI) cable) to an external display, such as the display 108. In some embodiments, the notable moments may be transferred over any suitable network (e.g., 106-1, 106-2, 106-3) from the computing device 102-1 to any other storage device (e.g., of the server 110, the computer device 102-2, and/or the computer device 102-3) of the system 100.

Figure 15:
FIG. 15 is a view of the computing device of FIGS. 1-4 coupled to the display of an exemplary embodiment.

Referring now to FIG. 15, a view of the computing device 102-1 coupled to the display 108 of an exemplary embodiment is shown. In such an embodiment, immediately prior to or after a performance (e.g., a dive), athletes may view a video clip on the display 108 in proximity to the diving board, the coaches, and/or other athletes. For example, FIG. 15 shows a coach standing by the computing device 102-1 such that the coach is able to manipulate video playback and/or annotate video for athletes to view on the external display 108 positioned near the diving board.

Figure 16:
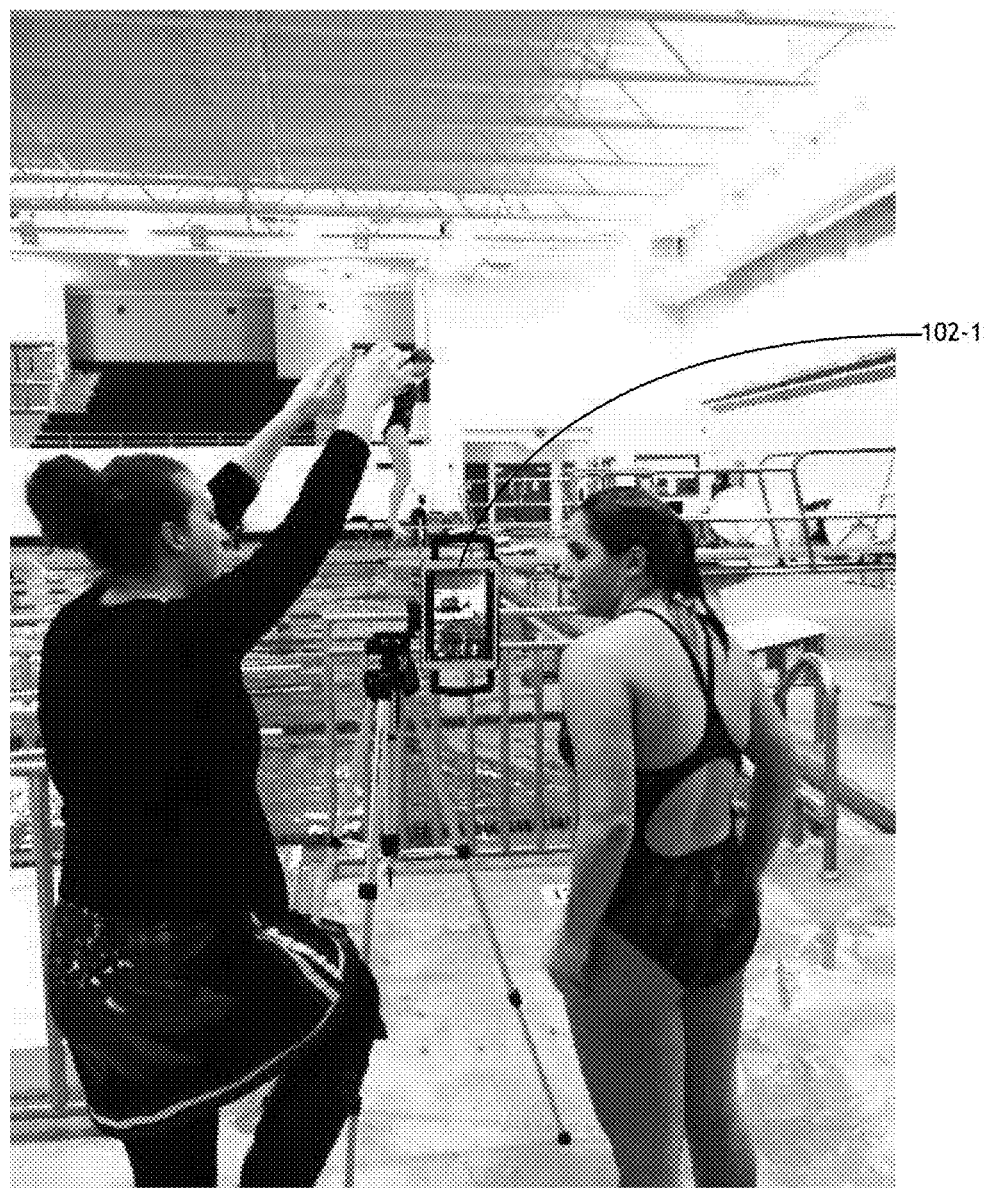
FIG. 16 is a view of the computing device of FIGS. 1-4 of an exemplary embodiment being used as an instruction tool by a coach to teach an athlete.

Referring now to FIG. 16, a view of the computing device 102-1 being used as an instruction tool by a coach to teach an athlete of an exemplary embodiment is shown. For example, the computing device 102-1 may be mounted and positioned on a tripod. The computing device 102-1 may be configured to record video, detect notable moments, playback notable moments, and enable the coach to manipulate playback rate and/or direction, as well as annotate the notable moments. For example, a coach or participant may record an audible or textual message and/or annotate (e.g., draw or write) on the video clips of the notable moments, and the computing device 102-1 may be configured to record the message and annotation as part of the notable moment video clip.

In some embodiments, the computing device 102-1 may be configured to automatically initiate playback of a most recently captured notable moment. For example, if a first diver completes his or her dive, the computing device 102-1 may detect the dive as a notable moment, store a video clip of the notable moment, and immediately playback the video clip of notable moment in a loop for the diver to review. Shortly after, if a second diver completes his or her dive, which the computing device 102-1 detects and stores, the computing device 102-1 may then stop playback of the first dive and begin playback of the second dive in a loop.

In some embodiments, the computing device 102-1 may display two or more detected notable moments (e.g., the immediately preceding two notable moments) simultaneously (e.g., side-by-side or in a grid) to allow users more time to review a notable moment before being replaced by a more recent notable moment.

In some embodiments, the computing device 102-1 may improve (e.g., optimize) the display 302 when a user interacts with playback (e.g. pauses or draws an annotation on top of the video) by focusing the playback on the video clip being interacted with and removing other content from the display 302.

In some embodiments, the computing device 102-1 may be configured to share stored notable moments with other users for playback at a later time.

In some embodiments, the computing device 102-1 may allow a user to manipulate the playback of the notable moment (e.g. pause, slow-motion, frame-by-frame scrubbing, reverse playback).

In some embodiments, the computing device 102-1 may allow a user to annotate via drawing, voice, and text tools over the notable moment to enhance its teaching value. The annotating user may be located in the same location as the consuming user (often the athlete being instructed), or the annotating user may be in a remote location viewing the clipped notable moments in real-time or on a delay and providing instruction or asking questions remotely through annotations. The annotations may be saved for later use by the user or to be shared with another user for later consumption. The annotations may be shared with another user or set of users who are in a remote location in real-time.

In some embodiments, the computing device 102-1 may automatically annotate the video with drawings and/or text to highlight useful information about the skill being performed or the environment. For example, such annotations may include one or more of the following: a line showing a maximum height of a dive along with a measurement of the maximum height; text displaying a takeoff velocity of a long jumper or diver; text displaying the rotational velocity of a diver or a vaulting gymnast completing multiple flips; text displaying swing speed of a golfer or baseball player; a number indicating an objective measure of an amount of splash a diver creates upon entry into the water; a visual indicator of a diver's maximum distance from the board; and a visual indicator comparing one skill to another (e.g., a graph showing a hang time of a most recent dive compared to hang times of the previous three dives).

In some embodiments, the computing device 102-1 may include the ability to flag particular moments for later review. Flagged moments may be organized into a dedicated location making it easier for a user to quickly navigate to the most relevant, interesting, or teachable moments after completion of practice or a competition.

In some embodiments, the computing device 102-1 may determine related notable moments and automatically display multiple related notable moments for comparison based on detected or manually-input attributes of the notable moments (e.g. after a diver completes a dive, the apparatus may automatically playback that dive in a loop along with a previously saved video clip of the same diver doing the same type of dive earlier in practice). This may allow users to compare and contrast similar performances. For example, a comparison video may include reference videos from a library of previously saved content that may be accessible over a network. For example, the library may include content of professional athletes completing similar skills to provide reference information (e.g., professional quality or optimal reference information) for comparison.

In some embodiments, the computing device 102-1 may automatically synchronize multiple video clips based on the detected notable moment information (e.g. when showing two long jump videos together, the videos may be synchronized so each shows the jumper leaving the ground at the exact same time).

In some embodiments, as the computing device 102-1 is playing back a notable moment, the computing device 102-1 may simultaneously continue to detect and save new notable moments as athletes continue to perform skills.

In some embodiments, the computing device 102-1 may automatically share notable moments with a computing device (e.g., 102-3) associated with the detected participant such as by sending the notable moment video over the network 106-2 to the server 110 over the network 106-3 to the participant's computing device 102-3 if that participant is associated with user data on the server 110. For example, the computing device 102-1 may determine the identity of the participant of a particular notable moment video clip and may send the video clip to the participant's computing device 102-3 or to an account associated with the participant.

In some embodiments, the computing device 102-1 may be configured to generate video clips of notable moments of dives during practice and tag them based on the participant's height. For example, the reference object may be the diving board.

In an exemplary embodiment, each motion detection point 1302 may be implemented as or include one or more of the following: a performance motion detection point (which also, for example, may be referred to as a dive motion detection point), an instant environmental false positive motion point (which may also be referred to as a camera motion false positive point), and/or an event start motion point (which may also be referred to as a start motion point). In an exemplary embodiment, the following exemplary parameters may be used by the computing device 102-1 for performing computer vision operations:

Performance Motion Detection Points (which also may be referred to as dive motion detection points):

Performance motion detection points are spread in a 7 point by 7 point grid that spans a width of 200 pixels and a height of 280 pixels.

A threshold value is a pixel change of 170 pixels while processing up to 4 frames per second.

The upper left hand corner of the performance motion detection point grid is placed 50 pixels right of the right end of the reference object if the reference object is on the left half of the image, otherwise the upper right hand corner of the box is placed 50 pixels left of the left edge of the reference object. The upper edge of the performance motion detection point grid is also placed 360 pixels above the reference object if the frame is in a portrait orientation or 200 pixels above the reference object if the frame is in landscape.

The event being captured is a dive. When the processor 206 determines that motion in the performance motion detection point grid has substantially stopped (e.g., stopped or stopped subject to noise or false-positive background motion), the processor may determine the end of a notable moment. The computing device 102-1 adds a timestamp to be used for the end of notable moment of a clip before generating the video clip.

Instant Environmental False Positive Motion Points (which also may be referred to as environmental false positive points):

Instant environmental false positive motion points are implemented as vertical lines of 7 points each that span a height of 280 pixels each.

A threshold value is a pixel change of 75 pixels while processing up to 4 frames per second.

When the reference object is located on the left of the screen, a first line of instant environmental false positive motion points is placed 50 pixels left from the left edge of the performance motion detection points, and a second line of instant environmental false positive motion points is placed 100 pixels right from the right edge of the points of the performance motion detection points. If the reference object is located on the right of the screen, then a first line of instant environmental false positive motion points is placed 100 pixels to the left of the left edge of the performance motion detection points, and a second line of instant environmental false positive motion points is placed 50 pixels to the right of the right edge of the performance motion detection points.

A false positive event being detected by the processor 206 at the instant environmental false positive motion points may be any motion through the camera field of view 402 other than a dive, such as an athlete walking around the perimeter of a pool.

Instant False Positive Motion Points (which also may be referred to as camera motion false positive points):

Instant camera motion false positive motion points are implemented as horizontal lines of 7 points each that span a width of 100 pixels each.

A threshold value is a pixel change of 30 pixels while processing up to 4 frames per second.

A first line of instant motion false positive motion points is placed 20 pixels from the left edge of the image.

A second line of instant camera motion false positive motion points is placed 20 pixels from the right edge of the image. Both lines of instant camera motion false positive motion points are placed at a height of 20 pixels from the top of the image.

The processor 206 is configured to detect movement of the camera 302 by analyzing the lines of instant motion false positive motion points, for example, so as to ensure that the camera is still and stationary when an event is captured.

Event Start Motion Detection Points (which also may be referred to as start motion points):

Event start motion detection points are implemented as a vertical line of 7 points that spans a height of 200 pixels.

A threshold value is a pixel change of 100 pixels while processing up to 5 frames per second.

The line of event start motion detection points is placed 100 pixels from the left edge of the frame if the reference object is on the left of the frame, or 100 pixels from the right edge of the frame if the reference object is on the right of the frame. The processor 206 may determine the beginning of an event or notable moment based on the diver walking onto the diving board and through the line of event start motion detection points. The processor 206 may add a timestamp to the video to indicate the beginning of a video clip.

While an exemplary embodiment has been described with respect to exemplary motion detection points having exemplary types of motion detection points, in an exemplary quantity, in an exemplary arrangement, with each motion detection point having exemplary parameters and an exemplary threshold, for an exemplary dive performance in an exemplary environment, some embodiments may include motion detection points having same or different suitable types of motion detection points, in any suitable quantity, in any suitable arrangement, having any suitable parameters and any suitable thresholds, and for any suitable performance in any suitable environment.

In some embodiments, the computing device 102-1 may be configured to capture other sporting events. For example, the computing device 102-1 may be configured for use with a long jump, triple jump, or gymnastics' vault event. For example, the computing device 102-1 may be configured to capture video of the runway with a wooden board in the center of the view. Potential reference objects may include a long jump pit, a take-off marker, a runway, or a vault. The computing device 102-1 may be configured to capture and store video clips of each jump or vault throughout the practice, with or without user interaction. The computing device 102-1 may be configured to analyze video clips and suggest tags of athletes based on athletes' heights on the runway. The computing device 102-1 may be configured to provide data overlays on the video clips of an athlete's jump distance, max jump height, and takeoff speed.

Figure 17:
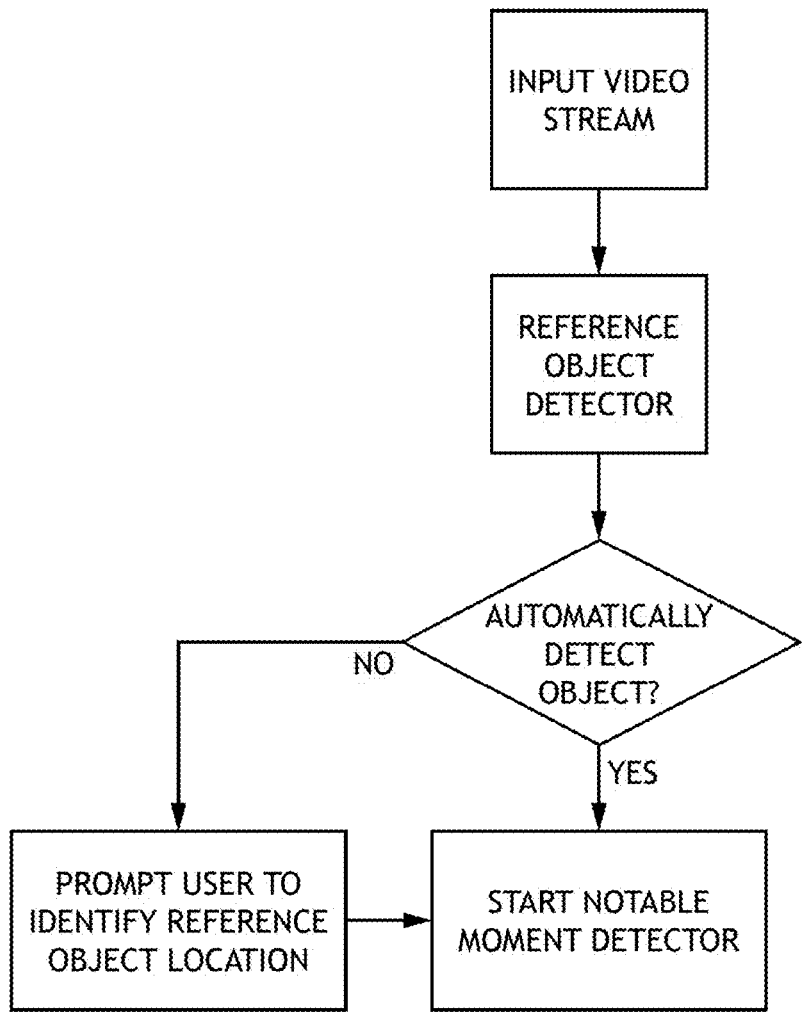
FIG. 17 shows a flow diagram of a method for identification of a reference object within a video stream of an exemplary embodiment.

Referring now to FIG. 17, a flow diagram of a method for identification of a reference object within a video stream of an exemplary embodiment is shown. The method of FIG. 17 may be performed by the processor 206 of the computing device 102-1. The method may include receiving an input video stream, which may include a reference object. The method may include determining if a reference object has been automatically detected by the computing device 102-1. If the reference object is automatically detected, the method may include detecting a notable moment and playing back a notable moment video clip, for example, as shown and described with respect to FIG. 18 and throughout. If the reference object is not automatically detected by the computing device 102-1, the computing device 102-1 may prompt the user to identify the reference object. Upon identification of the reference object by the user, such as by annotation of the input video or performance of a touch gesture, the method may include detecting a notable moment and playing back a notable moment video clip, for example, as shown and described with respect to FIG. 18 and throughout.

Figure 18:
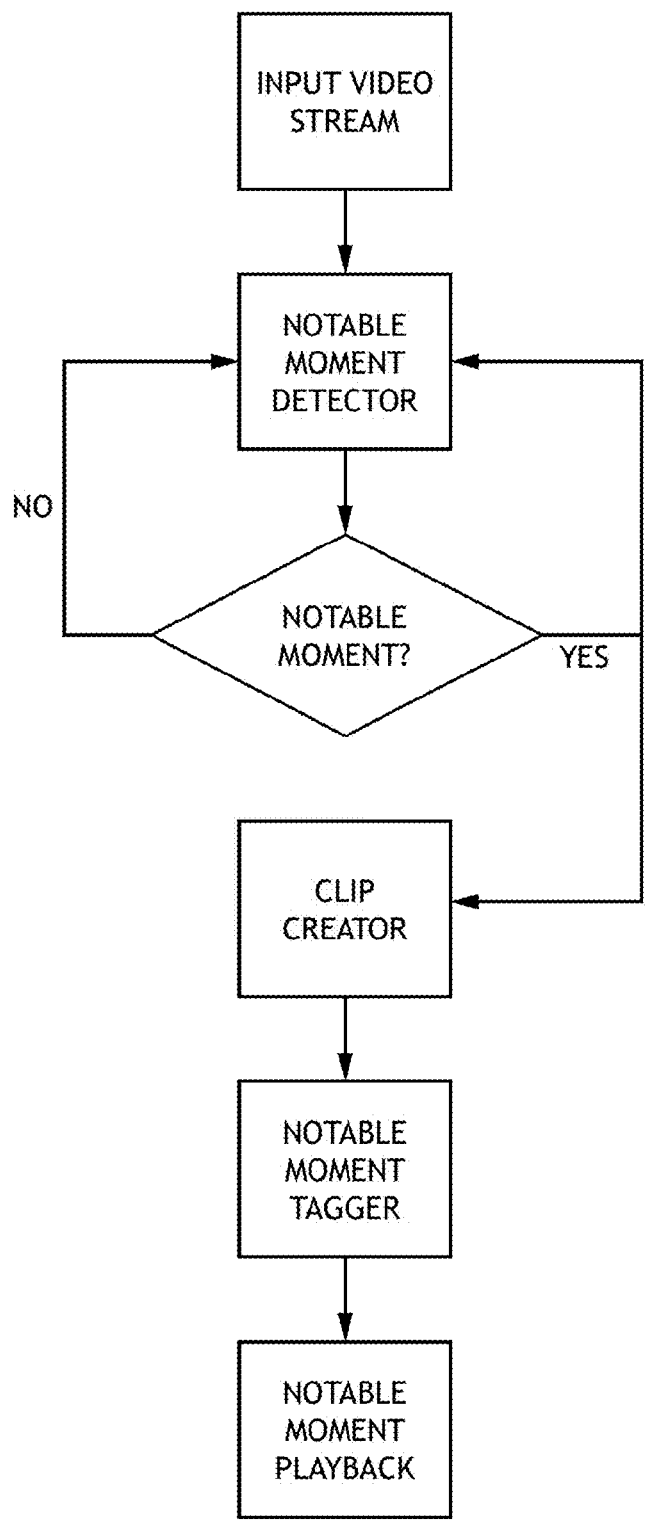
FIG. 18 shows a flow diagram of a method for detecting notable moments and replaying video clips of notable moments of an exemplary embodiment.

Referring now to FIG. 18, a method for detecting notable moments and replaying video clips of notable moments is shown. The method of FIG. 18 may be performed by the processor 206 of the computing device 102-1. The method may include receiving an input video stream, such as from the camera 302. The method may include continuously detecting notable moments. For example, the computing device 102-1 may be configured to determine notable moments based at least on motion of a user from frame to frame in comparison to a threshold value to determine if motion has been detected. If motion has been detected, the method may include generating a video clip of a notable moment. The method may further include tagging a notable moment video clip to include a number of characteristics, for example, which may include an identity of a participant and information related to a specific performance recorded in the video clip. Additionally, the method may include displaying the video clip of the notable moment and annotating the video clip of the notable moment in near real-time.

While exemplary operations have been described as being performed by the processor 206 of the computing device 102-1, in some embodiments, operations disclosed throughout may be performed any combination of processors which may be implemented in the computing device 102-1, as well as by any combination of processors located throughout the system 100 (e.g., at least one processor (e.g., 206) of the computing device 102-1, at least one processor of the computing device 102-2, at least one processor of the computing device 102-3, at least one processor of the server 110, or a combination thereof).

Embodiments may include a method and apparatus for automatically detecting and replaying notable moments of a performance, and the embodiments may provide a number of advantages compared to conventional video capture of a performance.

In conventional practice, a coach continuously records an entire practice session or competition so that nothing is missed. This presents a significant challenge of having to sift through a long video after the event is over to find notable moments, cut those segments out, and review them with the athlete. Embodiments for automatically detecting and replaying notable moments of a performance allow near real-time editing for immediate viewing and allow enhanced teaching.

Conventional video acquisition is further limited to a constrained area in the frame of the video, limited to looking for overall patterns in motion in pre-determined areas of the video. Conventional solutions do not work well for sports like diving or gymnastics where the camera angle and positioning of the athlete in the video frame are variable due to the constraints of filming in different gymnasiums and pools. Embodiments, which include the computing device 102-1 or a method of operation thereof, are configured to capture an expanded viewing capacity which allows effective video capture of much larger performances, such as dives and gymnastic exercises based at least on the utilization of a reference object.

Embodiments improve fields other than the field of video processing of events. For example, embodiments also improve fields of providing instruction and assessing performances (e.g., sporting performances, such as diving performances, gymnastic performances, and track and field performances) and performance skills related to such performances.

Embodiments may improve the functioning of a computer (e.g., the computing device 102-1 or the processor 206 thereof), itself, for example, by reducing computational workload required to perform video processing operations, which thereby increases computational efficiency, reduces power consumption, extends battery life of mobile computing devices.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer apparati), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing apparatus via a reasonable amount of experimentation. Those having skill in the art will recognize that a typical data processing apparatus generally includes one or more of an apparatus unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing apparatus may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A method, executable by at least one processor, for detecting and outputting notable moments of a performance, the method comprising:
receiving, by at least one processor, an input video stream of a performance;
determining, by the at least one processor, a location of a reference object within the input video stream;
determining, by the at least one processor, a notable moment within the input video stream based at least in part on the location of the reference object, the notable moment including an amount of motion greater than a threshold value, wherein determining, by the at least one processor, the location of the reference object within the input video stream further comprises:
predictively determining, by the at least one processor, the location of the reference object within the input video stream by:
performing a color filtering operation on at least one video frame;
eroding and dilating the at least one color filtered video frame to remove noise from the color filtering operation;
locating contours within the at least one eroded and dilated video frame; and
selecting a particular contour of the contours;
generating, by the at least one processor, a video clip including the determined notable moment, a portion of the input video stream preceding the determined notable moment, and a portion of the input video stream following the determined notable moment; and
outputting, by the at least one processor, the video clip.

2. The method of claim 1, wherein determining, by the at least one processor, the location of the reference object within the input video stream further comprises:
automatically determining, by the at least one processor, the location of the reference object within the input video stream.

3. The method of claim 1, further comprising:
receiving, by the at least one processor, a user input at least one of indicating or confirming the location of the reference object, wherein determining, by the at least one processor, the location of the reference object within the input video stream further comprises:
determining, by the at least one processor, the location of the reference object within the input video stream based at least in part on the user input.

4. The method of claim 1, further comprising:
performing, by the at least one processor, at least one motion detection operation on points positioned in the input video stream proximal to the reference object by calculating at least one motion flow magnitude on the points,
wherein determining, by the at least one processor, the notable moment within the input video stream based at least in part on the location of the reference object, the notable moment including the amount of the motion greater than the threshold value further comprises:
determining, by the at least one processor, the notable moment within the input video stream based at least in part on the location of the reference object and the at least one calculated motion flow magnitude, the notable moment including an amount of motion greater than the threshold value.

5. The method of claim 1, wherein outputting, by the at least one processor, the video clip further comprises:
outputting, by the at least one processor, the video clip to a display for presentation to a user.

6. The method of claim 1, wherein outputting, by the at least one processor, the video clip further comprises:
outputting, by the at least one processor, the video clip to a display for presentation to a user in substantially real time.

7. The method of claim 1, wherein outputting, by the at least one processor, the video clip further comprises:
outputting, by the at least one processor, the video clip to be stored in a storage device.

8. The method of claim 1, wherein outputting, by the at least one processor, the video clip further comprises:
outputting, by the at least one processor, the video clip for transmission to another processor.

9. The method of claim 1, further comprising:
overlaying, by the at least one processor, a graphical indicator on the video clip, wherein outputting, by the at least one processor, the video clip further comprises:
outputting, by the at least one processor, the video clip overlaid with the graphical indicator.

10. The method of claim 1, further comprising:
determining, by the at least one processor, an identity of a participant depicted in the notable moment of the video clip; and
tagging, by the at least one processor, the video clip with metadata including information of the identity of the participant depicted in the notable moment of the video clip.

* * * * *